US012471710B2

United States Patent
Tsai

(10) Patent No.: US 12,471,710 B2
(45) Date of Patent: Nov. 18, 2025

(54) FOLDING CHAIR ARMREST LOCKING DEVICE AND FOLDING CHAIR

(71) Applicant: SPORT DIVERSIONS INC., Taipei (TW)

(72) Inventor: Yi-Ting Tsai, Taipei (TW)

(73) Assignee: SPORT DIVERSIONS INC., Taipei (TW)

( * ) Notice: Subject to any disclaimer, the term of this patent is extended or adjusted under 35 U.S.C. 154(b) by 198 days.

(21) Appl. No.: 18/423,333

(22) Filed: Jan. 26, 2024

(65) Prior Publication Data
US 2025/0241444 A1 Jul. 31, 2025

(51) Int. Cl.
*A47C 1/026* (2006.01)

(52) U.S. Cl.
CPC .................................. *A47C 1/0265* (2013.01)

(58) Field of Classification Search
CPC ....... A47C 1/03; A47C 1/0305; A47C 1/0307; A47C 1/0265; F16H 7/0848; F16H 2007/0853; F16H 2007/0855; F16H 55/26; F16H 2061/2876
See application file for complete search history.

(56) References Cited

U.S. PATENT DOCUMENTS

| 7,500,715 | B1* | 3/2009 | Chen ........................ A47C 4/46 |
| | | | 297/27 |
| 9,046,153 | B2* | 6/2015 | Yoshida ............... F16H 7/0848 |
| 11,241,097 | B2* | 2/2022 | Cieszko .................. A47C 4/46 |
| 12,144,430 | B2* | 11/2024 | Cieszko ............. A47C 1/03244 |
| 2013/0274045 | A1* | 10/2013 | Yoshida ............... F16H 7/0848 |
| | | | 474/101 |
| 2020/0383481 | A1* | 12/2020 | Cieszko .................. A47C 4/46 |
| 2022/0167746 | A1* | 6/2022 | Cieszko ............. A47C 1/0307 |

FOREIGN PATENT DOCUMENTS

| FR | 2593050 A3 * | 7/1987 | ............... A47C 4/16 |
| JP | 3002524 U * | 3/1994 | |

* cited by examiner

*Primary Examiner* — Philip J Bonzell

(57) ABSTRACT

A folding chair armrest locking device and a folding chair are introduced to enhance user safety of the folding chair. The folding chair armrest locking device includes a casing having therein a storage and an armrest fitting portion in communication with the storage; a rack having an armrest coupling portion and a first dentate portion and being partially disposed in the armrest fitting portion, with the first dentate portion partially facing the storage; and a locking module having a locking element, a wrench and a resilient component, the locking element having a first end with a second dentate portion, the second dentate portion being disposed in the storage and facing the first dentate portion, the wrench having a pivotal connection portion eccentrically positioned and pivotally connected to a second end of the locking element, and the resilient component being disposed in the storage and resiliently supporting the locking element.

9 Claims, 10 Drawing Sheets

FOLDING CHAIR ARMREST LOCKING DEVICE AND FOLDING CHAIR

BACKGROUND OF THE INVENTION

1. Field of the Invention

The present disclosure relates to a locking device for use with a folding chair and the folding chair, and in particular to a folding chair armrest locking device for locking armrests of a folding chair and the folding chair on which the folding chair armrest locking device is mounted.

2. Description of the Related Art

Every conventional folding chair operates in two states, i.e., unfolded state and folded state. In the unfolded state, the conventional folding chairs are available. In the folded state, at least the volume of the chairs is minimized in the front-to-rear direction of the chairs to render it easy to store or move the chairs. Some conventional folding chairs are even designed to be comfortable, as each of them has a backrest and two armrests which flank the backrest.

BRIEF SUMMARY OF THE INVENTION

However, none of the conventional folding chairs has any securing structure for maintaining the unfolded state during the unfolded state; as a result, the joints of the chairs tend to bend under an inappropriate force and switch to the folded state, causing sitters to fall off and get injured.

In view of this, the disclosure provides a folding chair armrest locking device which is mounted on armrests of a folding chair and can be easily switched between a fastened state and an unfastened state. In the fastened state, the folding chair stays either unfolded or folded. The disclosure further provides a folding chair on which the folding chair armrest locking device is mounted.

Direction-related wording or the like used herein, such as "front", "rear", "left", "right", "upper (top)", "lower (bottom)", "in", "out", and "lateral", mainly refers to the directions depicted in accompanying drawings. The direction-related wording or the like is aimed at assisting with describing and understanding embodiments of the disclosure rather than limiting the disclosure.

Quantitative terms, such as "a", "an" and "one", are used herein to describe components and elements of the disclosure merely for the sake of convenience and provides the ordinary meaning of the scope of the disclosure. In the disclosure, the quantitative terms must be interpreted to include one or at least one, and every singular noun must be interpreted to include its corresponding plural noun unless stated otherwise.

The meaning of similar expressions used herein, such as "be coupled to", "be fitted to" and "be mounted on", includes options, namely "after being connected, elements can still be separated without being damaged" and "after being connected, elements become inseparable". Persons skilled in the art can select one of the options according to the materials of which the elements to be connected are made or assembly requirements.

To achieve the above and other objectives, the disclosure provides a folding chair armrest locking device, comprising: a casing having therein an armrest fitting portion and a storage in communication with the armrest fitting portion; a rack having an armrest coupling portion and a first dentate portion and being partially disposed in the armrest fitting portion, with the first dentate portion partially facing the storage; and a locking module having a locking element, a wrench and a resilient component, with a second dentate portion disposed at a first end of the locking element and in the storage and facing the first dentate portion, the wrench having a pivotal connection portion eccentrically positioned and pivotally connected to a second end of the locking element, with the resilient component disposed in the storage and resiliently supporting the locking element, wherein the resilient component pushes the locking element to allow the second dentate portion to mesh with the first dentate portion when the wrench is located at a locked position, wherein, when the wrench pivotally rotates to an unlocked position, the locking element is pulled downward to cause complete separation of the second dentate portion and the first dentate portion, and the wrench abuts against the casing to enable the locking element to compress the resilient component.

The disclosure further provides a folding chair, comprising at least one folding chair armrest locking device described above and mounted on at least one armrest pipe of the folding chair, wherein the rack is coupled to the armrest pipe through the armrest coupling portion, and the casing is fitted to the armrest pipe.

Regarding the folding chair armrest locking device, the storage of the casing has an opening, the casing having a securing element coupled to the opening, the securing element having a penetrating hole, with the locking element penetrating the penetrating hole, and the second end of the locking element is disposed outside the penetrating hole and pivotally connected to the pivotal connection portion of the wrench, allowing the wrench to abut against the securing element when the wrench is located at the unlocked position.

Regarding the folding chair armrest locking device, the resilient component has at least one resilient body disposed in the storage, the resilient body having an end abutting against the securing element and the other end abutting against a rear side of the second dentate portion.

Regarding the folding chair armrest locking device, the securing element has a surface facing the resilient body, the surface having at least one auxiliary positioning portion, and the locking element has at least one auxiliary positioning portion disposed on the rear side of the second dentate portion, allowing two ends of the resilient body to be auxiliarily positioned by the two auxiliary positioning portions respectively.

Regarding the folding chair armrest locking device, the wrench has a first edge and a second edge adjacent to the first edge, the first edge of the wrench is positioned proximate to the casing when the wrench is located at the locked position, and the second edge of the wrench abuts against the casing when the wrench is located at the unlocked position, with a first distance defined between a pivotal connection center of the pivotal connection portion and the first edge, and a second distance defined between a pivotal connection center of the pivotal connection portion and the second edge, the first distance being less than the second distance.

The folding chair has a main frame rod, a rear leg rod and a front leg rod. The top end of the rear leg rod is pivotally connected to the front leg rod. A portion between the top and bottom ends of the rear leg rod is pivotally connected to the main frame rod. The top end of the front leg rod is pivotally connected to the casing above the armrest pipes.

The folding chair has a backrest. The bottom end of the backrest is pivotally connected to the main frame rod. The armrest pipe is pivotally connected to a portion between the bottom and top ends of the backrest.

Regarding the folding chair, the armrest coupling portion has at least one positioning post and at least one locking hole, and the armrest pipe has a plurality of pores, allowing the positioning post of the armrest coupling portion to penetrate a corresponding one of the pores of the armrest pipe. The fastening elements penetrate the locking hole and the pores such that the rack is coupled to and secured to the armrest pipe.

Therefore, a folding chair armrest locking device of the disclosure is mounted on an armrest pipe of a folding chair and equipped with a wrench for switching to a locked position to allow a locking element of a locking module to mesh with a rack and thus prevent a casing from sliding relative to the armrest pipe, so as for the folding chair to stay in an unfolded state and be unlikely to deform inadvertently, enhancing user safety. Furthermore, when the wrench is switched to an unlocked position, the casing can slide relative to the armrest pipe to render it easy to adjust the level of sitting comfortability or fold the folding chair into a folded state, enhancing the ease of use of the folding chair.

DETAILED DESCRIPTION OF THE INVENTION

Figure 1:
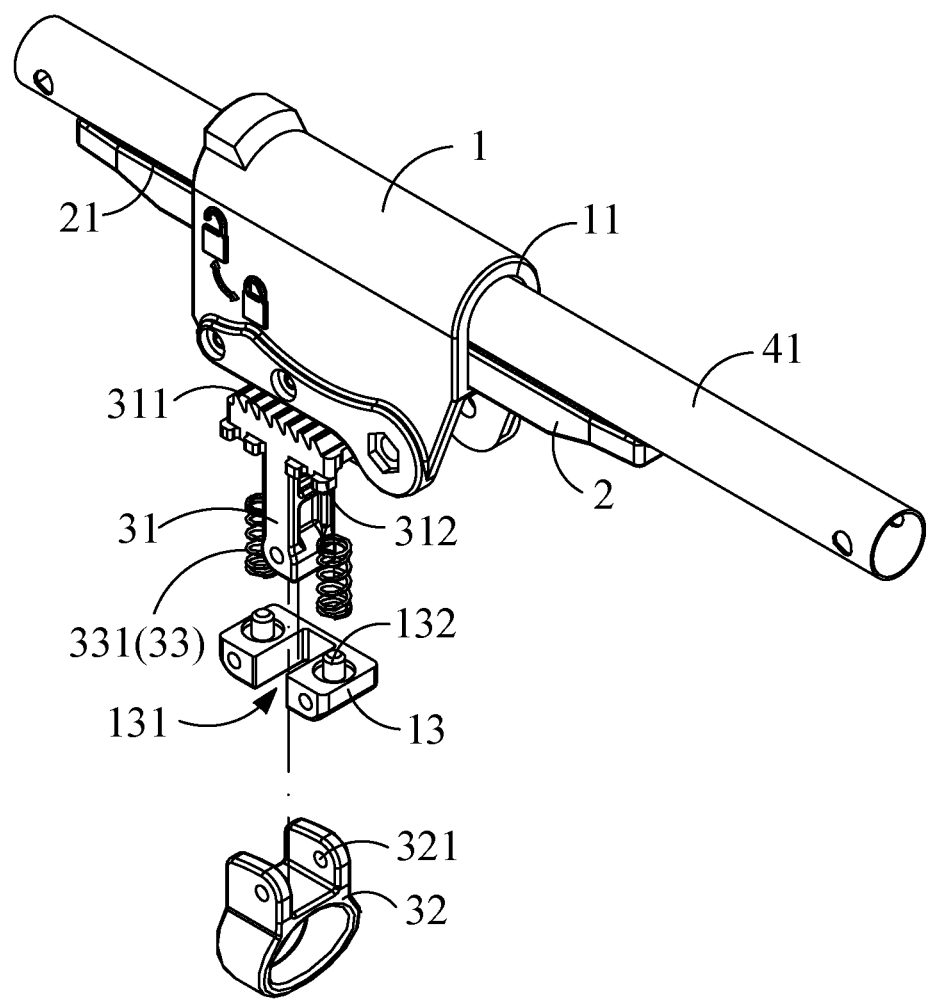
FIG. 1 is an exploded view of a folding chair according to an embodiment of the disclosure.

To facilitate understanding of the object, characteristics and effects of the present disclosure, embodiments together with the attached drawings for the detailed description of the present disclosure are provided.

Referring to FIG. 1 through FIG. 4 and FIG. 7, a folding chair armrest locking device in a preferred embodiment of the disclosure comprises a casing 1, a rack 2 and a locking module 3. The rack 2 and the locking module 3 are partially disposed in the casing 1. The folding chair armrest locking device is mounted on an armrest pipe 41 of a folding chair 4.

The casing 1 has therein an armrest fitting portion 11 and a storage S. The casing 1 is fitted to the armrest pipe 41 through the armrest fitting portion 11. The casing 1 can slide relative to the armrest pipe 41 along the axial direction of the armrest pipe 41. The storage S is in communication with the armrest fitting portion 11.

The rack 2 has an armrest coupling portion 21 and a first dentate portion 22. The rack 2 is coupled to the outer circumferential surface of the armrest pipe 41 through the armrest coupling portion 21. When the casing 1 is fitted to the armrest pipe 41, the rack 2 is partially disposed in the armrest fitting portion 11, and a portion of the first dentate portion 22 faces the storage S.

The locking module 3 has a locking element 31, a wrench 32 and a resilient component 33. A second dentate portion 311 is disposed at a first end of the locking element 31 and in the storage S and faces the first dentate portion 22. The wrench 32 is located outside the casing 1. The wrench 32 has a pivotal connection portion 321 eccentrically positioned. The wrench 32 is pivotally connected to a second end of the locking element 31 through the pivotal connection portion 321. The resilient component 33 is disposed in the storage S and resiliently supports the locking element 31.

Figure 3:
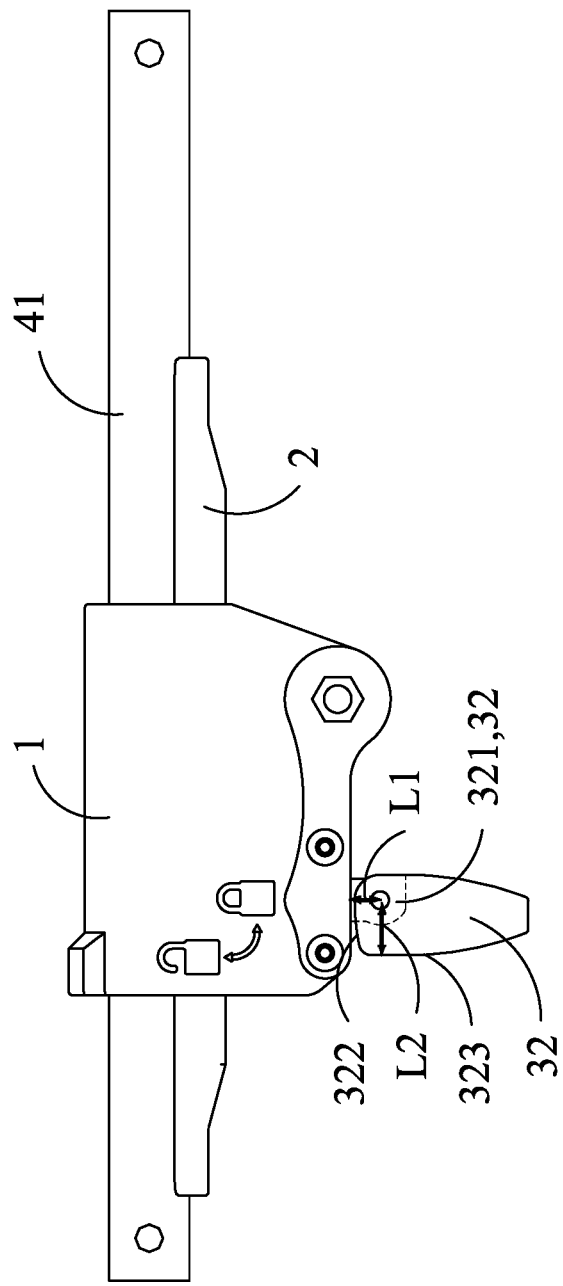
FIG. 3 is a lateral view of a wrench located at a locked position according to an embodiment of the disclosure.
Figure 4:
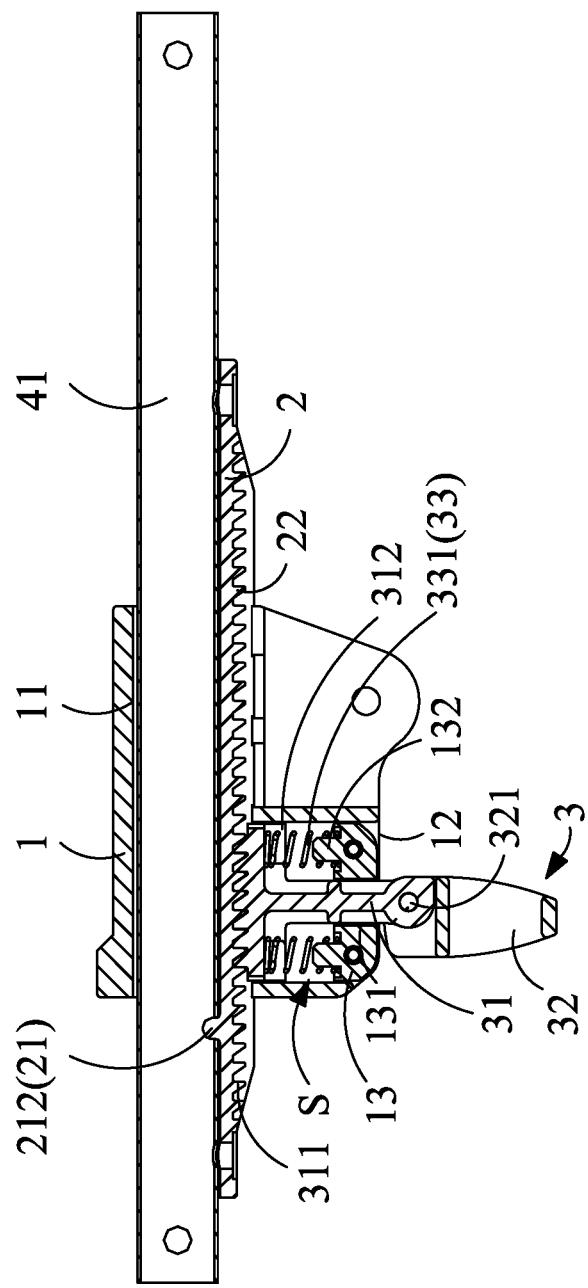
FIG. 4 is a lateral cross-sectional view of the wrench located at the locked position according to an embodiment of the disclosure.
Figure 5:
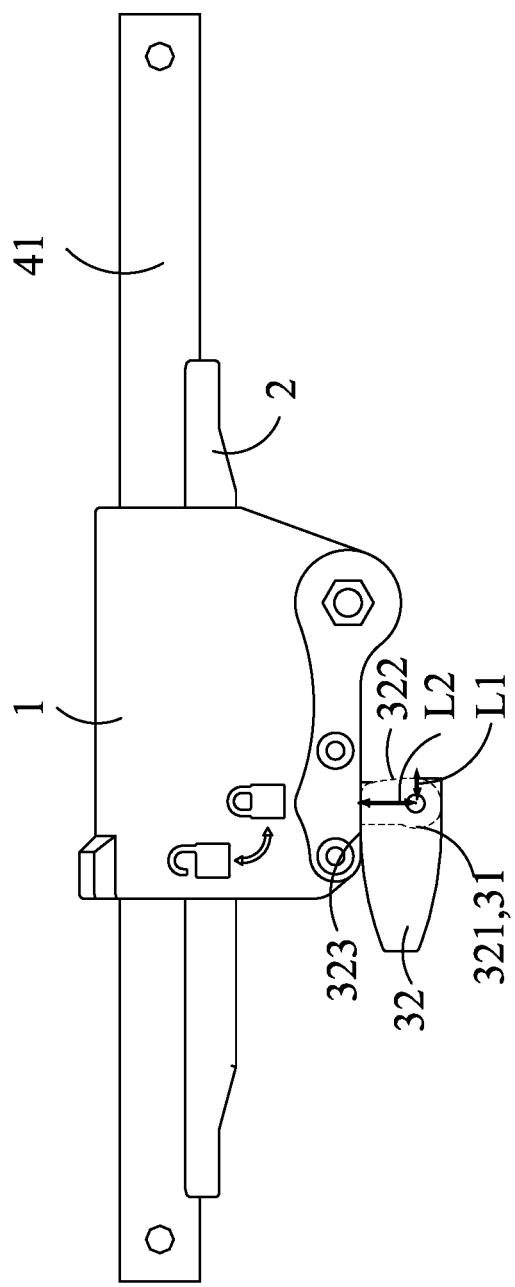
FIG. 5 is a lateral view of the wrench located at an unlocked position according to an embodiment of the disclosure.
Figure 6:
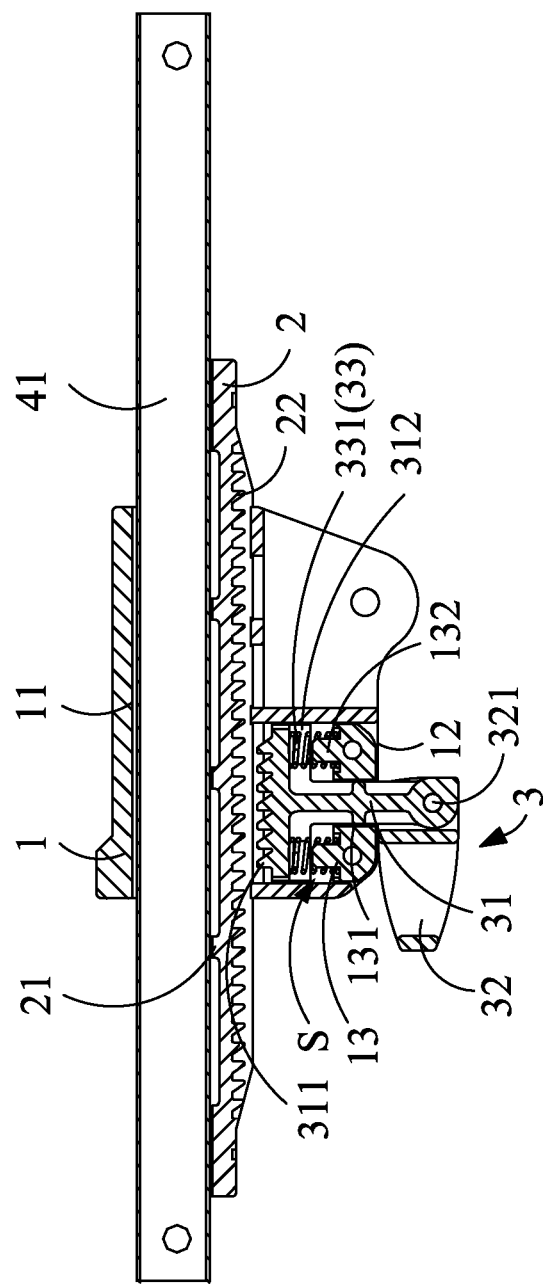
FIG. 6 is a lateral cross-sectional view of the wrench located at the unlocked position according to an embodiment of the disclosure.

Referring to FIG. 3 and FIG. 4, when the wrench 32 is located at a locked position, the resilient component 33 resiliently pushes the locking element 31 to allow the second dentate portion 311 to mesh with the first dentate portion 22. Referring to FIG. 5 and FIG. 6, since the pivotal connection portion 321 of the wrench 32 is eccentrically positioned, the locking element 31 is pulled downward while the wrench 32 rotates pivotally and switches from the locked position to an unlocked position to cause complete separation of the second dentate portion 311 and the first dentate portion 22. When the wrench 32 pivotally rotates to the unlocked position, the outer edge of the wrench 32 abuts against the casing 1 to enable the locking element 31 to keep compressing the resilient component 33. At this point in time, since the second dentate portion 311 of the locking element 31 does not mesh with the first dentate portion 22 of the rack 2, the casing 1 slides relative to the armrest pipe 41 along the axial direction of the armrest pipe 41. After the casing 1 has slid to a new position, the wrench 32 reversely, pivotally rotates to return to the locked position shown in FIG. 3 and FIG. 4, resulting in a decrease in the downward pulling force exerted by the wrench 32 on the locking element 31. Thus, the locking element 31 is pushed upward under the restoring force of the resilient component 33, allowing the second dentate portion 311 of the locking element 31 to mesh with the first dentate portion 22 of the rack 2 again.

In an embodiment of the disclosure, the folding chair armrest locking device is mounted on an armrest pipe 41 of a folding chair 4; preferably, one said folding chair armrest locking device is mounted on each of two armrest pipes 41 of the folding chair 4. The folding chair 4 further has a main frame rod 42, a rear leg rod 43 and a front leg rod 44. The top end of the rear leg rod 43 is pivotally connected to the front leg rod 44. The portion between the top and bottom ends of the rear leg rod 43 is, directly or indirectly, pivotally connected to the main frame rod 42. The top end of the front leg rod 44 is pivotally connected to the casing 1 above the armrest pipes 41.

Figure 7:
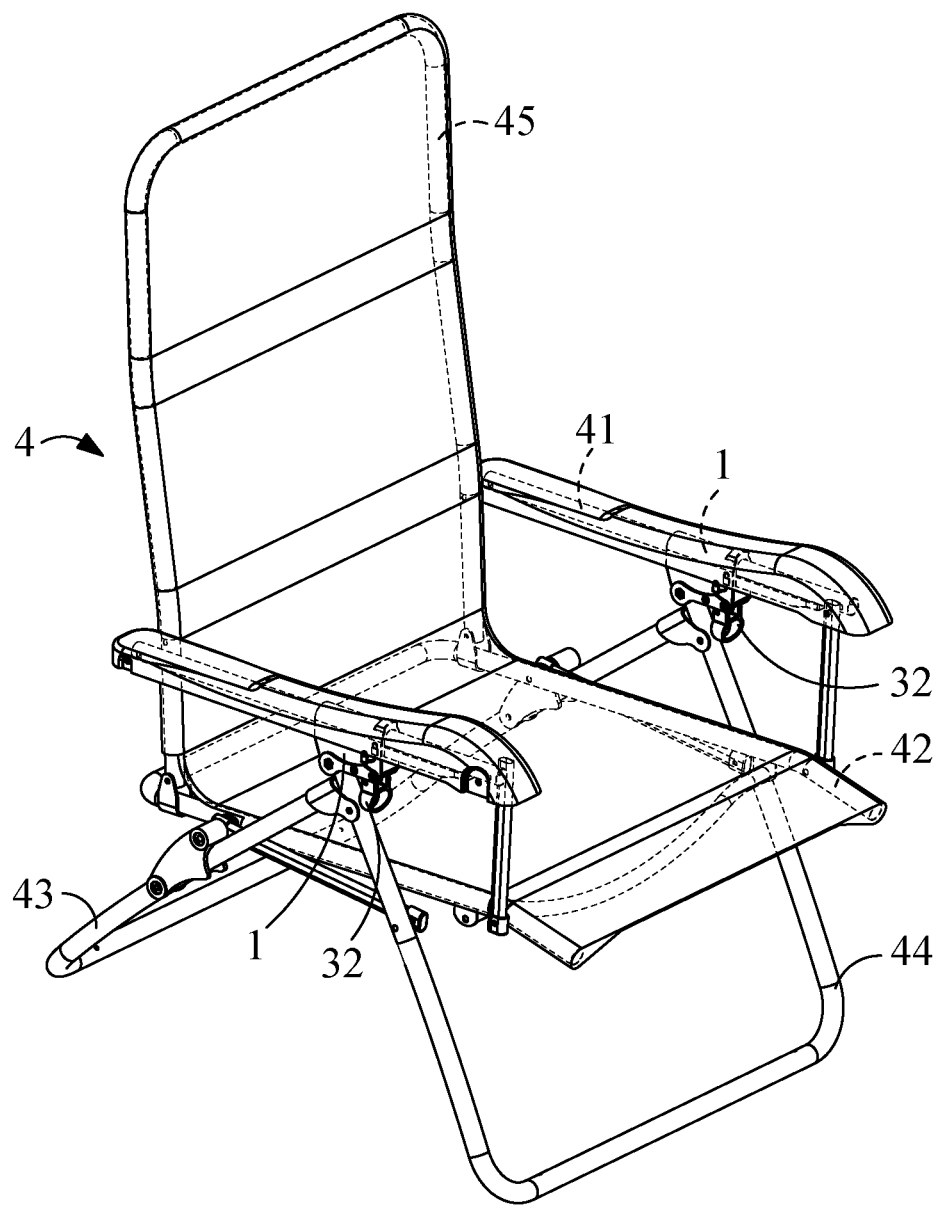
FIG. 7 is a perspective view of the folding chair in an unfolded state according to an embodiment of the disclosure.

When the wrench 32 is located at the unlocked position, the casing 1 slides relative to the armrest pipes 41 such that the folding chair 4 is smoothly unfolded to enter the unfolded state shown in FIG. 7. After the folding chair 4 has been unfolded to enter the unfolded state, a user can switch the wrench 32 to the locked position such that the locking element 31 and the rack 2 mesh with each other to prevent the casing 1 from sliding relative to the armrest pipes 41, keep the folding chair 4 in the unfolded state, and prevent the main frame rod 42, the rear leg rod 43 and the front leg rod 44 from pivotally rotating relative to each other. Therefore, pivotal-rotation parts of the folding chair 4 which stays in the unfolded state are unlikely to undergo pivotal rotation inadvertently, so as to enhance user safety and effectively reduce the chance of users falling off inadvertently and getting injured.

Figure 8:
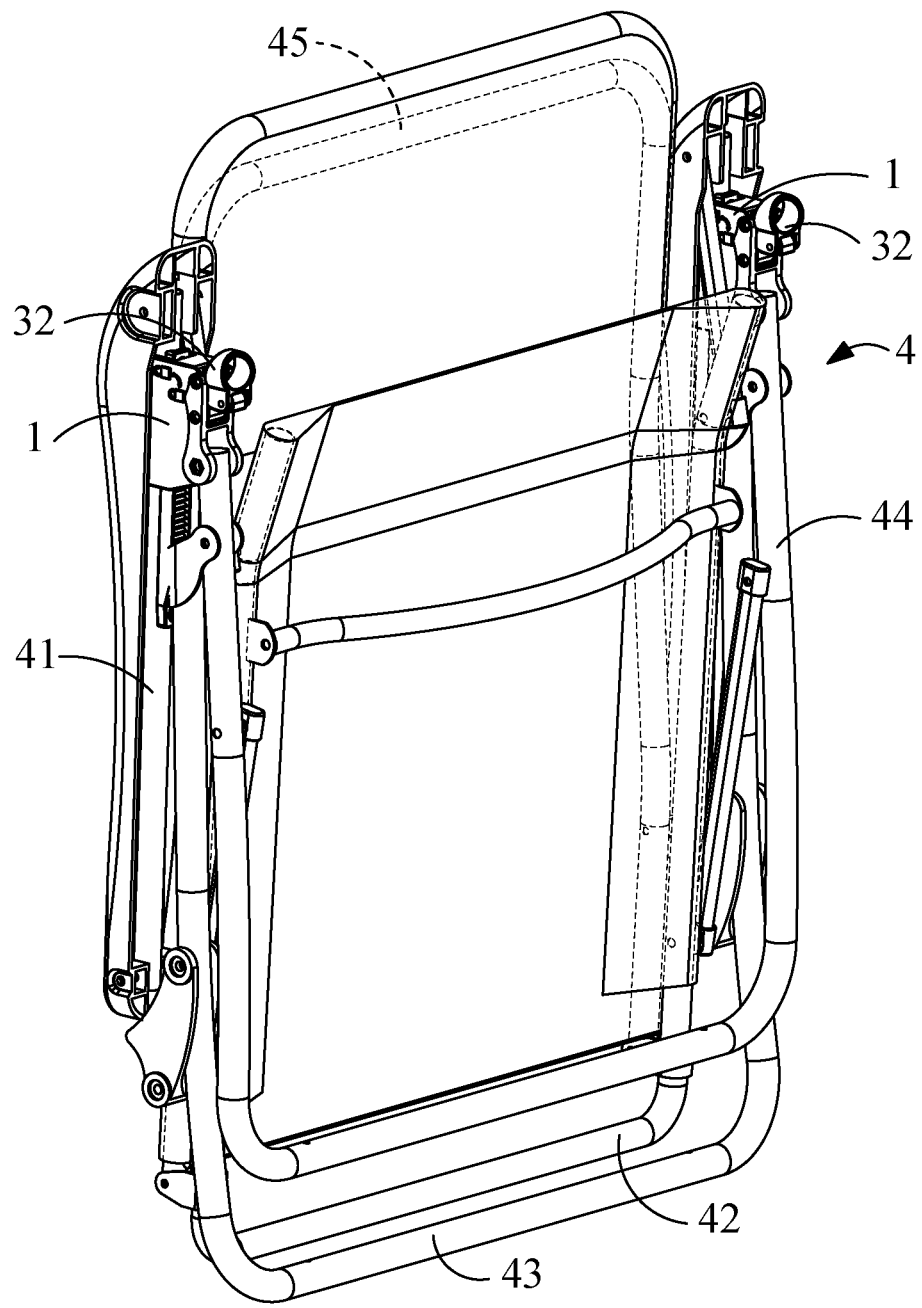
FIG. 8 is a perspective view of the folding chair in a folded state according to an embodiment of the disclosure.

To stop using the folding chair 4, the user switches the wrench 32 to the unlocked position such that the casing 1 can slide relative to the armrest pipe 41 again, allowing the folding chair 4 to be smoothly folded to enter the folded state shown in FIG. 8. When the folding chair 4 is in the folded state, the wrench 32 can be switched to the locked position again such that the folding chair 4 can stay in the folded state to prevent the folding chair 4 from unfolding while being stored or moved.

Figure 9:
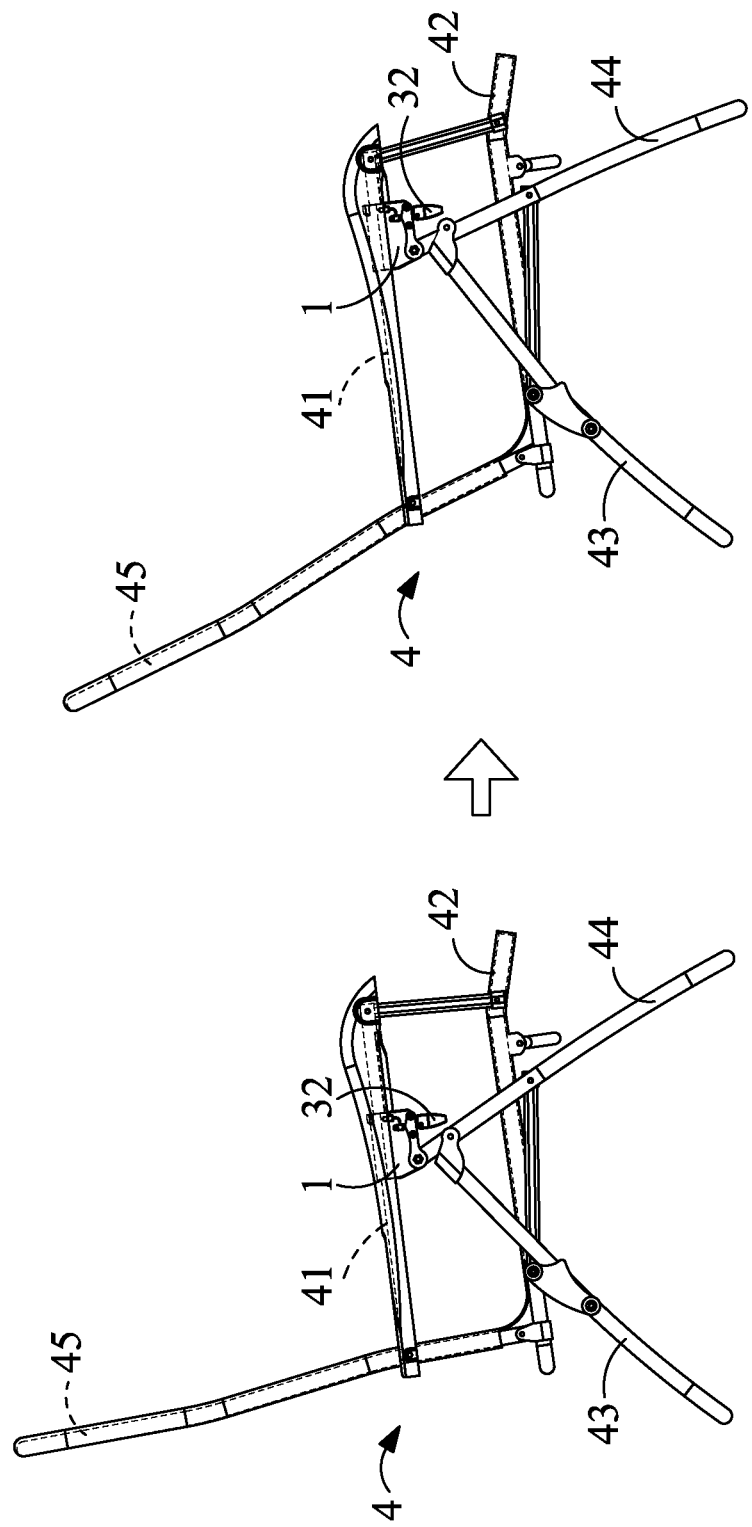
FIG. 9 is a schematic view of the folding chair capable of adjusting the tilt angle of a backrest according to an embodiment of the disclosure.

Referring to FIG. 9, in an embodiment of the disclosure, the folding chair 4 further has a backrest 45. The bottom end of the backrest 45 is pivotally connected to the main frame rod 42. The armrest pipe 41 is, directly or indirectly, pivotally connected to the portion between the top and bottom ends of the backrest 45. When the wrench 32 is located at the unlocked position, the casing 1 slides relative to the armrest pipe 41, and the backrest 45 pivotally rotates relative to the main frame rod 42 and the armrest pipe 41, adjusting a tilt angle of the backrest 45 not only greatly but also finely. After the tilt angle has been adjusted to render the backrest 45 comfortable, the user switches the wrench 32 to the locked position to maintain the tilt angle. Therefore, the folding chair 4 with the backrest 45 offers a comfortable sitting experience to the user.

Figure 2:
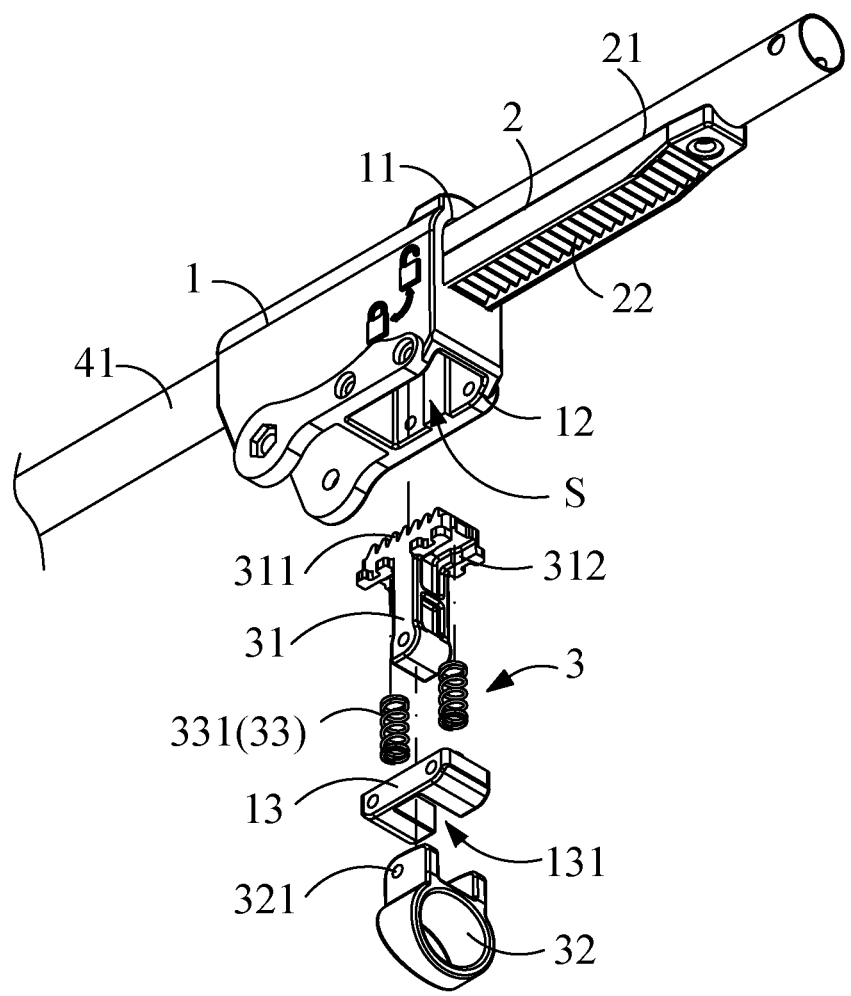
FIG. 2 is an exploded view of the folding chair from another view angle according to an embodiment of the disclosure.

Referring to FIG. 1, FIG. 2 and FIG. 4, in an embodiment of the disclosure, the storage S of the casing 1 has an opening 12, and the casing 1 has a securing element 13 coupled to the opening 12, such that the second dentate portion 311 of the locking element 31 and the resilient component 33 in use are confined to the storage S and thus prevented from falling off via the opening 12. The securing element 13 has a penetrating hole 131. The locking element 31 penetrates the penetrating hole 131. The second end of the locking element 31 is disposed outside the penetrating hole 131, and thus the pivotal connection portion 321 of the wrench 32 can be pivotally connected to the second end of the locking element 31. When the wrench 32 is located at the unlocked position, the wrench 32 abuts against the securing element 13. Therefore, in this embodiment, the casing 1 is not only structurally simple and conducive to a reduction in manufacturing cost but also enables the locking module 3 to be easily mounted on the casing 1.

In an embodiment of the disclosure, the resilient component 33 has at least one resilient body 331 disposed in the storage S, and the resilient body 331 has one end abutting against the securing element 13 and the other end abutting against the rear side of the second dentate portion 311. Therefore, in this embodiment, the resilient component 33 is very easy to mount in place and excellently capable of undergoing resilient deformation and restoration.

In an embodiment of the disclosure, the securing element 13 has a surface facing the resilient body 331, with the surface having at least one auxiliary positioning portion 132, and the locking element 31 has at least one auxiliary positioning portion 312 disposed on the rear side of the second dentate portion 311, allowing two ends of the resilient body 331 to be auxiliarily positioned by the two auxiliary positioning portions 132, 312 respectively to ensure that the resilient body 331 is subjected to a force acting in an expected direction and provides a restoring force. For instance, the auxiliary positioning portion 132 disposed on the securing element 13 is a hollow, and a protruding post is disposed in the hollow. One end of the resilient body 331 is inserted into the hollow and fitted around the protruding post. The auxiliary positioning portion 312 disposed at the locking element 31 is in the form of two opposing jaws between which the other end of the resilient body 311 is placed.

Referring to FIG. 3 and FIG. 5, in an embodiment of the disclosure, the wrench 32 has a first edge 322 and a second edge 323 adjacent to the first edge 322. When the wrench 32 is located at the locked position shown in FIG. 3, the first edge 322 of the wrench 32 is positioned proximate to the casing 1. When the wrench 32 is located at the unlocked position shown in FIG. 5, the second edge 323 of the wrench 32 abuts against the casing 1. A first distance L1 is defined between the pivotal rotation center of the pivotal connection portion 321 and the first edge 322. A second distance L2 is defined between the pivotal rotation center of the pivotal connection portion 321 and the second edge 323. The first distance L1 is less than the second distance L2. Therefore, this embodiment provides the structural simplicity required for the pivotal connection portion 321 to be eccentrically positioned and for the locking element 31 to be effectively pulled down by the wrench 32 in order to disengage from the rack 2 when the wrench 32 is located at the unlocked position.

Figure 10:
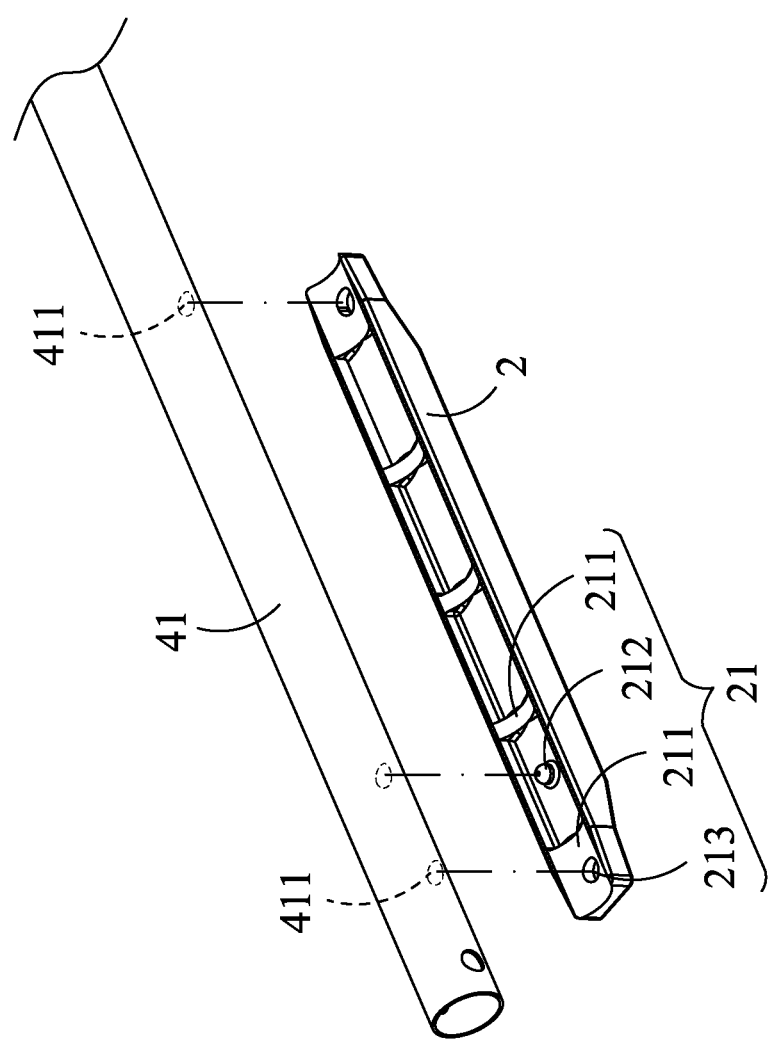
FIG. 10 is an exploded view of a rack and an armrest pipe according to an embodiment of the disclosure.

Referring to FIG. 10, in an embodiment of the disclosure, at least one curved surface 211 of the armrest coupling portion 21 of the rack 2 is attached to the outer circumferential surface of the armrest pipe 41. The armrest coupling portion 21 further has at least one positioning post 212 and at least one locking hole 213. A plurality of pores 411 are disposed on the outer circumferential surface of the armrest pipe 41. The positioning post 212 of the armrest coupling portion 21 penetrates a corresponding one of the pores 411 of the armrest pipe 41. Fastening elements, such as screws, penetrate the locking hole 213 and the pores 411. Thus, not only is the rack 2 coupled to and secured to the outer circumferential surface of the armrest pipe 41, but the rack 2 is also prevented from rotating or sliding. Therefore, in this embodiment, the rack 2 is structurally simple and thus is not only conducive to a reduction in manufacturing cost but also easy to be mounted on the armrest pipe 41.

The invention is disclosed above by preferred embodiments. However, persons skilled in the art should understand that the embodiments are illustrative of the invention only, but shall not be interpreted as restrictive of the scope of the invention. Hence, all equivalent variations and replacements made to the aforesaid embodiments shall be deemed falling within the scope of the claims of the invention. Accordingly, the legal protection for the invention shall be defined by the appended claims.

What is claimed is:

1. A folding chair armrest locking device, comprising:
a casing having therein an armrest fitting portion and a storage in communication with the armrest fitting portion;
a rack having an armrest coupling portion and a first dentate portion and being partially disposed in the armrest fitting portion, with the first dentate portion partially facing the storage; and
a locking module having a locking element, a wrench and a resilient component, with a second dentate portion disposed at a first end of the locking element and in the storage and facing the first dentate portion, the wrench having a pivotal connection portion eccentrically positioned and pivotally connected to a second end of the locking element, with the resilient component disposed in the storage and resiliently supporting the locking element, wherein the resilient component pushes the locking element to allow the second dentate portion to mesh with the first dentate portion when the wrench is located at a locked position, wherein, when the wrench pivotally rotates to an unlocked position, the locking element is pulled downward to cause complete separation of the second dentate portion and the first dentate portion, and the wrench abuts against the casing to enable the locking element to compress the resilient component.

2. The folding chair armrest locking device of claim 1, wherein the storage of the casing has an opening, the casing having a securing element coupled to the opening, the securing element having a penetrating hole, with the locking element penetrating the penetrating hole, and the second end of the locking element is disposed outside the penetrating hole and pivotally connected to the pivotal connection portion of the wrench, allowing the wrench to abut against the securing element when the wrench is located at the unlocked position.

3. The folding chair armrest locking device of claim 2, wherein the resilient component has at least one resilient body disposed in the storage, the resilient body having an end abutting against the securing element and another end abutting against a rear side of the second dentate portion.

4. The folding chair armrest locking device of claim 3, wherein the securing element has a surface facing the resilient body, the surface having at least one auxiliary positioning portion, and the locking element has at least one auxiliary positioning portion disposed on the rear side of the second dentate portion, allowing two ends of the resilient body to be auxiliarily positioned by the two auxiliary positioning portions respectively.

5. The folding chair armrest locking device of claim 1, wherein the wrench has a first edge and a second edge adjacent to the first edge, the first edge of the wrench is positioned proximate to the casing when the wrench is located at the locked position, and the second edge of the wrench abuts against the casing when the wrench is located at the unlocked position, with a first distance defined between a pivotal connection center of the pivotal connection portion and the first edge, and a second distance defined between a pivotal connection center of the pivotal connection portion and the second edge, the first distance being less than the second distance.

6. A folding chair, comprising at least one folding chair armrest locking device recited in claim 1 and mounted on at least one armrest pipe of the folding chair, wherein the rack is coupled to the armrest pipe through the armrest coupling portion, and the casing is fitted to the armrest pipe.

7. The folding chair of claim 6, wherein the folding chair has a main frame rod, a rear leg rod and a front leg rod, a top end of the rear leg rod is pivotally connected to the front leg rod, a portion between the top and bottom ends of the rear leg rod is pivotally connected to the main frame rod, and a top end of the front leg rod is pivotally connected to the casing above the armrest pipes.

8. The folding chair of claim 6, wherein the folding chair has a backrest, a bottom end of the backrest is pivotally connected to the main frame rod, and the armrest pipe is pivotally connected to a portion between the bottom and top ends of the backrest.

9. The folding chair of claim 6, wherein the armrest coupling portion has at least one positioning post and at least one locking hole, and the armrest pipe has a plurality of pores, allowing the positioning post of the armrest coupling portion to penetrate a corresponding one of the pores of the armrest pipe, wherein fastening elements penetrate the locking hole and the pores such that the rack is coupled to and secured to the armrest pipe.

\* \* \* \* \*